United States Patent
Zhou

(10) Patent No.: US 8,659,634 B2
(45) Date of Patent: Feb. 25, 2014

(54) METHOD AND SYSTEM FOR IMPLEMENTING THREE-PARTY VIDEO CALL BY MOBILE TERMINALS

(75) Inventor: Jianzheng Zhou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 40 days.

(21) Appl. No.: 13/258,637

(22) PCT Filed: Jun. 22, 2010

(86) PCT No.: PCT/CN2010/074198
§ 371 (c)(1),
(2), (4) Date: Jul. 18, 2012

(87) PCT Pub. No.: WO2011/088656
PCT Pub. Date: Jul. 28, 2011

(65) Prior Publication Data
US 2012/0281055 A1    Nov. 8, 2012

(30) Foreign Application Priority Data

Jan. 22, 2010   (CN) .......................... 2010 1 0102645

(51) Int. Cl.
*H04N 7/14*   (2006.01)
*H04M 1/00*   (2006.01)
*H04M 3/42*   (2006.01)
*H04B 7/00*   (2006.01)

(52) U.S. Cl.
USPC .................... 348/14.02; 348/14.08; 455/416; 455/500; 455/552.1

(58) Field of Classification Search
USPC ......... 348/14.01, 14.02, 14.08; 455/416, 500, 455/552.1, 553.1; 379/88.05, 93.09, 379/202.01, 205.01
See application file for complete search history.

(56) References Cited

U.S. PATENT DOCUMENTS

| 6,907,227 B2 | 6/2005 | Fujioka |
|---|---|---|
| 7,526,253 B2 | 4/2009 | Fujioka |

(Continued)

FOREIGN PATENT DOCUMENTS

| CN | 1832569 A | 9/2006 |
|---|---|---|
| CN | 101036346 A | 9/2007 |
| WO | 2009111853 A1 | 9/2009 |

OTHER PUBLICATIONS

International Search Report in international application number: PCT/CN2010/074198, mailed on Nov. 18, 2010.

(Continued)

*Primary Examiner* — Binh Tieu
(74) *Attorney, Agent, or Firm* — Oppedahl Patent Law Firm LLC

(57) ABSTRACT

The disclosure discloses a method for implementing a three-party video call by mobile terminals, which comprises: starting a Bluetooth feature of an intelligent mobile terminal acting as a server and that of an intelligent mobile terminal acting as a client, respectively; after a server intelligent mobile terminal and a client intelligent mobile terminal are bound together in terms of Bluetooth, starting, by the server intelligent mobile terminal and the client intelligent mobile terminal, their respective real-time transmission threads and real-time reception threads, and performing, by the server intelligent mobile terminal, audio/video data processing, so as to implement the three-party video call with a third party intelligent mobile terminal. The disclosure further discloses a system for implementing a three-party video call by mobile terminals. Use of the method and system enables intelligent mobile terminals to implement a three-party video call function, thereby user experience is satisfied.

11 Claims, 3 Drawing Sheets

(56) References Cited

U.S. PATENT DOCUMENTS

2002/0193073 A1    12/2002  Fujioka
2005/0201310 A1     9/2005  Fujioka
2008/0031176 A1     2/2008  Hus
2008/0094467 A1*    4/2008  An et al. .................... 348/14.02
2012/0019610 A1*    1/2012  Hornyak et al. ........... 348/14.02

OTHER PUBLICATIONS

English Translation of the Written Opinion of the International Search Authority in international application number: PCT/CN2010/074198, mailed on Nov. 18, 2010.

* cited by examiner

METHOD AND SYSTEM FOR IMPLEMENTING THREE-PARTY VIDEO CALL BY MOBILE TERMINALS

TECHNICAL FIELD

The disclosure relates to the videophone technologies of intelligent mobile terminals, particularly to a method and system for implementing a three-party video call by mobile terminals.

BACKGROUND

With the development of the mobile communication technology, it becomes a characteristic service content of the intelligent mobile phone of the 3rd-generation (3G) mobile communication technology to realize the videophone in mobile terminals, such as mobile phones from a variety of low-end mobile phones. Through the videophone, the face-to-face real-time communication of people can be realized, namely: the both parties of the call can see each other during the call. The videophone has been widely applied to many aspects, such as teleconference, distance teaching, telemedicine and is the like in recent years, and the videophone comprises two-party call, three-party call and the like, wherein the three-party call is also known as conference call in which the third party call can be accessed without interrupting the existing call of the two parties, so as to further realize multi-party call with each other.

However, in the present videophone application of the mobile terminal, the three-party call cannot be implemented due to the limitations of the 3G network bandwidth. Specifically speaking, the bandwidth allocation mechanism of the 3G network is very similar to the wireless router, whose theoretical downlink speed is up to 3-4 Mbit/s, and the theoretical uplink speed is up to about 2 Mbit/s, however in the practical application, in addition to allocating certain channels to the wireless Internet users to use, the base station has to allocate certain channels to the voice communication users to use, that is to say, the channel resources of the 3G network are not shared by each user individually, but are shared by multiple users. Therefore, in the practical application, the access speed of the 3G network not only depends on the signal strength of the base station, but also depends on the current communication traffic of the base station; if the base station is very idle, the access speed is very fast, on the contrary, the access speed is very slow.

In such a case, to implement the three-party call in the videophone application of the mobile terminal will greatly increase the consumption of the network bandwidth, even when the network bandwidth is smaller than a certain value, the three-party call cannot be established, thereby the user experience is greatly affected. Therefore, how to use the limited bandwidth to implement the three-party call in the videophone application of the mobile terminal becomes an important technical content in the research and development of the 3G intelligent mobile phone.

SUMMARY

In view of this, the disclosure mainly aims to provides a method and a system for implementing three-party call of videophone by mobile terminals for solving the defect in the prior art that the videophone cannot be implemented by using the 3G network.

To achieve the above purpose, the technical solution of the disclosure is realized as follows.

A method for implementing a three-party video call by mobile terminals comprises:

starting a Bluetooth feature of an intelligent mobile terminal acting as a server and that of an intelligent mobile terminal acting as a client, respectively;

after a server intelligent mobile terminal and a client intelligent mobile terminal are bound together in terms of Bluetooth, starting, by the server intelligent mobile terminal and the client intelligent mobile terminal, their respective real-time transmission threads and real-time reception threads, and performing, by the server intelligent mobile terminal, audio/video data processing, so as to implement the three-party video call with a third party intelligent mobile terminal.

In the above solution, the server intelligent mobile terminal and the third party intelligent mobile terminal may perform data transmission via a third generation (3G) network; and the client intelligent mobile terminal may be not connected to the 3G network.

In the above solution, the method may further comprise:

distributing, by the server intelligent mobile terminal, current information data in the server intelligent mobile terminal to the client intelligent mobile terminal;

receiving, by the real-time reception thread in the server intelligent mobile terminal, audio/video data from the bound client intelligent mobile terminal;

performing, by the real-time transmission thread and the real-time reception thread in the client intelligent mobile terminal, data exchange with the server intelligent mobile terminal respectively.

In the above solution, the performing, by the server intelligent mobile terminal, audio/video data processing, so as to implement the three-party video call with the third party intelligent mobile terminal may comprise:

processing and then communicating to the third party intelligent mobile terminal, by is the server intelligent mobile terminal, the received audio/video data from the client intelligent mobile terminal, and processing and then communicating to the client intelligent mobile terminal, by the server intelligent mobile terminal, the received audio/video data from the third party intelligent mobile terminal;

receiving, by the third party intelligent mobile terminal via the 3G network, the audio/video data processed by the server intelligent mobile terminal;

receiving, by the client intelligent mobile terminal using a Socket-based Bluetooth technique, the audio/video data sent by the server, until the call ends.

In the above solution, the processing, by the server intelligent mobile terminal, the received audio/video data from the client intelligent mobile terminal may comprise:

performing bitmap conversion, clipping and merging on received image data; and performing sound mixing, automatic gain control and echo suppression processing on the received audio data under a 3G network protocol.

In the above solution, the receiving, by the client intelligent mobile terminal using the Socket-based Bluetooth technique, the audio/video data sent by the server may comprise: performing, under a Bluetooth protocol, data processing on the received audio/video data, according to specific application demands.

In the above solution, the ending of the call may comprise:

automatically breaking, by the server intelligent mobile terminal, the Socket connection with the client intelligent mobile terminal, after receiving hang-up information from the third party intelligent mobile terminal; or automatically breaking the Socket connection between the server intelligent mobile terminal and the client intelligent mobile terminal, upon a disconnection request issued from either the server intelligent mobile terminal or the client intelligent mobile terminal.

The disclosure further provides a system for implementing a three-party video call by mobile terminals, which comprises: a server intelligent mobile terminal, a client intelligent mobile terminal, a base station and a third party intelligent mobile terminal; wherein, the server intelligent mobile terminal may be configured to process audio/video data from the client intelligent mobile terminal; to send the processed audio/video data along with its own audio/video data to the third party intelligent mobile terminal; and to distribute received audio/video data from the third party intelligent mobile terminal along with its own audio/video data to the client intelligent mobile terminal;

the client intelligent mobile terminal may be configured to receive the audio/video data from the server intelligent mobile terminal, and to send the audio/video data to the server intelligent mobile terminal; wherein the client intelligent mobile terminal is connected to the server intelligent mobile terminal by using a Socket-based Bluetooth technique;

the base station may be configured to transfer the audio/video data between the server intelligent mobile terminal and the third party intelligent mobile terminal; and the third party intelligent mobile terminal may be configured to receive the audio/video data from the server intelligent mobile terminal, and to send the audio/video data to the server intelligent mobile terminal.

In the above solution, the client intelligent mobile terminal may comprise one or more intelligent mobile terminals.

In the solution provided by the disclosure, the client intelligent mobile terminal sends the audio/video data to the server intelligent mobile terminal in the call via the Socket-based Bluetooth technique; the server intelligent mobile terminal processes the received audio/video data from the client intelligent mobile terminal, and then processes the processed audio/video data along with its own information data according to the network protocol used by it, and then sends together to the third part intelligent mobile terminal via the 3G network; furthermore, after receiving the audio/video data from the third part intelligent mobile terminal, the server intelligent mobile terminal processes the audio/video data from the third party and its own audio/video data according to the Bluetooth protocol, and provides to the client intelligent mobile terminal for sharing via its own Bluetooth module; in this way, the video call between multiple close-distance intelligent mobile terminals and the long-distance mobile terminal can be realized, while the network bandwidth is the same as the call bandwidth of the two parties without additional consumption, thereby user experience is satisfied.

DETAILED DESCRIPTION

In the present Bluetooth protocol 2.0+EDR, the data transmission rate of the Socket-based Bluetooth technique can reach 2-4 Mbit/s, so the demands to bear the videophone can be met on the bandwidth. Therefore, the basic idea of the disclosure is that: multiple close-distance intelligent mobile terminals are composed into a Bluetooth local area network through the Bluetooth technique, wherein one intelligent mobile terminal acts as a server, and all of the rest intelligent mobile terminal(s) may act as the client. The client intelligent mobile terminal sends audio/video data to the server intelligent mobile terminal in a call via the Socket-based Bluetooth technique; the server intelligent mobile terminal processes the received audio/video data of the client intelligent mobile terminal, and then performs the video call with a third party via the 3G network together with its own information data; the server intelligent mobile terminal performs video call with the client intelligent mobile terminal(s) via the Socket-based Bluetooth technique with the audio/video data of the third party intelligent mobile terminal and its own information data together.

The disclosure is described below with reference to drawings and embodiments in detail.

Figure 1:
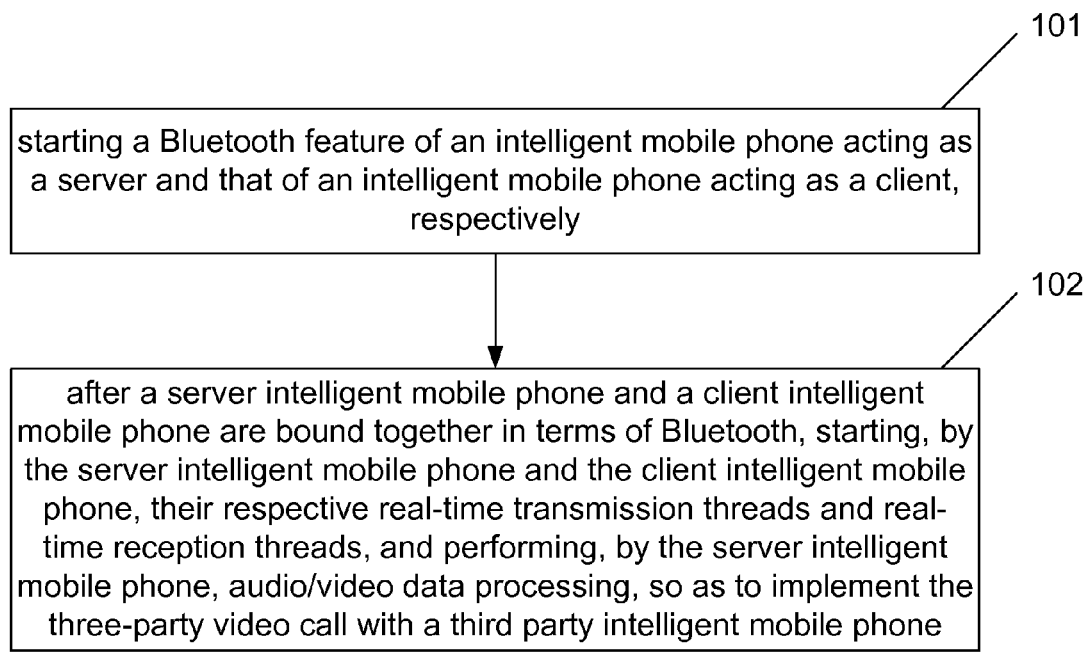
FIG. 1 shows a flowchart of a method for implementing a three-party video call by mobile terminals of the disclosure.

By taking the intelligent mobile phone as an example, the method for implementing a three-party video call by mobile terminals of the disclosure is shown in FIG. 1, comprising the following steps.

Step 101: starting a Bluetooth feature of an intelligent mobile phone acting as a server and that of an intelligent mobile phone acting as a client, respectively;

Step 102: after a server intelligent mobile phone and a client intelligent mobile phone are bound together in terms of Bluetooth, starting, by the server intelligent mobile phone and the client intelligent mobile phone, their respective real-time transmission threads and real-time reception threads, and performing, by the server intelligent mobile phone, audio/video data processing, so as to implement the three-party video call with a third party intelligent mobile phone.

Wherein, the server intelligent mobile phone and the third party intelligent mobile phone perform data transmission via the 3G network; the client intelligent mobile phone is not connected to the 3G network.

The real-time transmission thread in the server intelligent mobile phone is specifically configured to distribute current information data in the server intelligent mobile phone to the client intelligent mobile phone; the real-time reception thread in the server intelligent mobile phone receives audio/video data from the bound client intelligent mobile phone; the real-time transmission thread and real-time reception thread in the client intelligent mobile phone correspond to the real-time transmission thread and real-time reception thread of the server intelligent mobile phone, and exchange data with the server intelligent mobile phone respectively.

Figure 2:
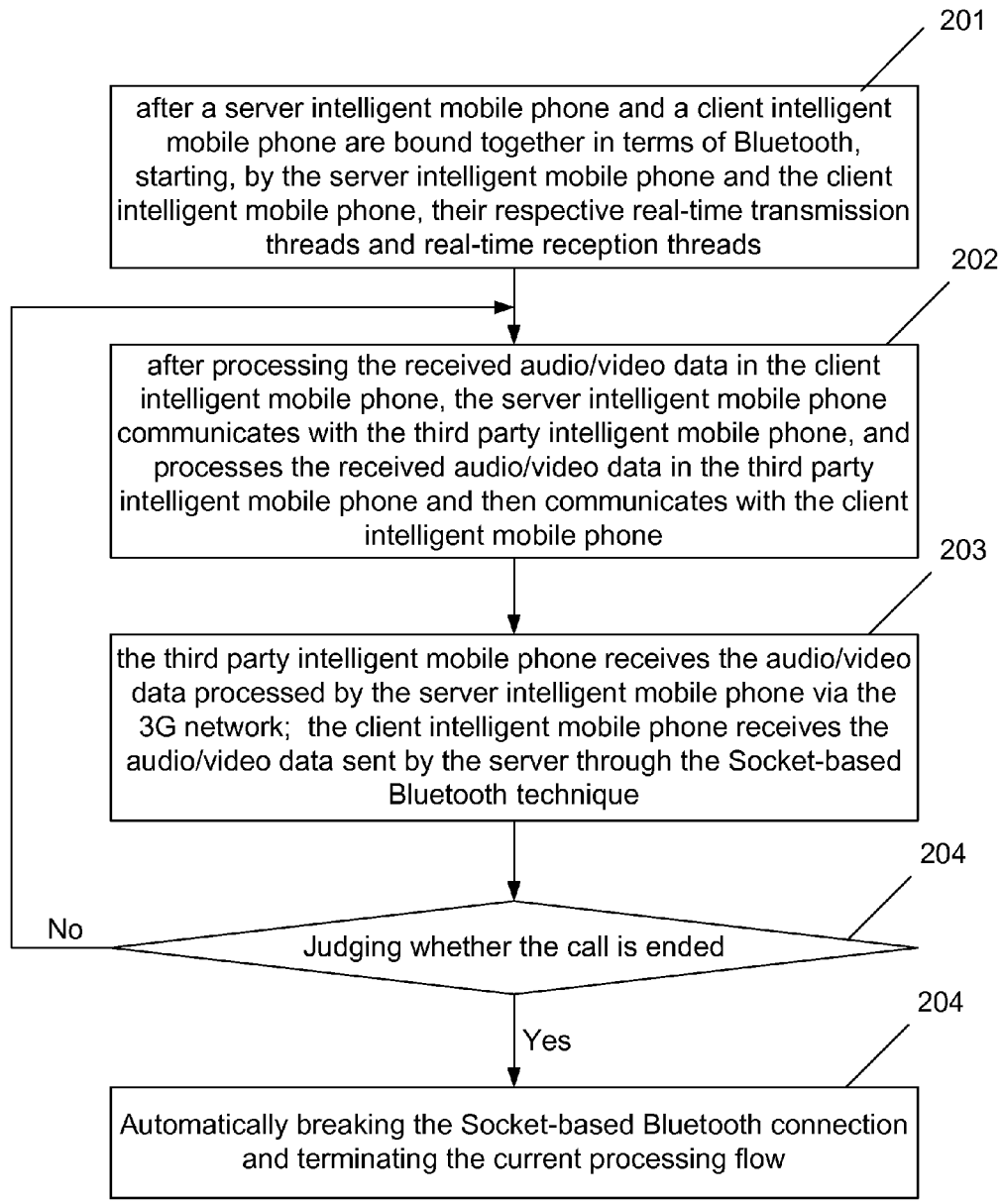
FIG. 2 shows a flowchart of a method for implementing Step 102 in the flowchart shown in FIG. 1.

In the above steps, the specific processing of Step 102 is shown in FIG. 2, which comprises the following steps.

Step 201: after a server intelligent mobile phone and a client intelligent mobile phone are bound together in terms of Bluetooth, starting, by the server intelligent mobile phone and the client intelligent mobile phone, their respective real-time transmission threads and real-time reception threads;

Step 202: after processing the received audio/video data in the client intelligent mobile phone, the server intelligent mobile phone communicates with the third party intelligent mobile phone, and processes the received audio/video data in the third party intelligent mobile phone and then communicates with the client intelligent mobile phone;

herein, processing the received audio/video data of the client intelligent mobile phone comprises: performing bitmap conversion, clipping and merging on received image data, so that the image data in the client intelligent mobile phone can be merged with the image data in the server intelligent mobile phone according to provisions of a 3G network protocol, thus the image data in the server intelligent mobile phone and client intelligent mobile phone can be added simultaneously to the third party intelligent mobile phone under the bandwidth of the 3G network; and performing the processing, such as sound mixing, automatic gain control, echo suppression and the like on the received audio data according to the provisions of the 3G network protocol, so that the voice information in the server and client intelligent mobile phone can be distinguished clearly on the third party intelligent mobile phone.

Processing the received audio/video data in the third party intelligent mobile phone specifically comprises: processing the received audio/video data based on a Bluetooth protocol according to specific application demands.

Step 203: the third party intelligent mobile phone receives the audio/video data processed by the server intelligent mobile phone via the 3G network; the client intelligent mobile phone receives the audio/video data sent by the server through the Socket-based Bluetooth technique.

Herein, the processed audio/video data comprises: audio/video data in the server intelligent mobile phone itself and the audio/video data in the client intelligent mobile phone in communication with the server via the Bluetooth; the received audio/video data sent by the server comprises: the audio/video data in the third party intelligent mobile phone received by the intelligent mobile phone via the 3G network and the audio/video data in the server intelligent mobile phone itself.

Step 204: judging whether the call is ended; if yes, automatically breaking the Socket-based Bluetooth connection and terminating the current processing flow; otherwise, returning to Step 202.

Here, judging the call is ended specifically comprises: after receiving hanging-up information from the third party intelligent mobile phone, the server intelligent mobile phone automatically breaks the Socket connection with the client intelligent mobile phone; or, either the server intelligent mobile phone or the client intelligent mobile phone issues the request to break the connection, and the Socket connection between the server intelligent mobile phone and the client intelligent mobile phone is automatically broken.

Figure 3:
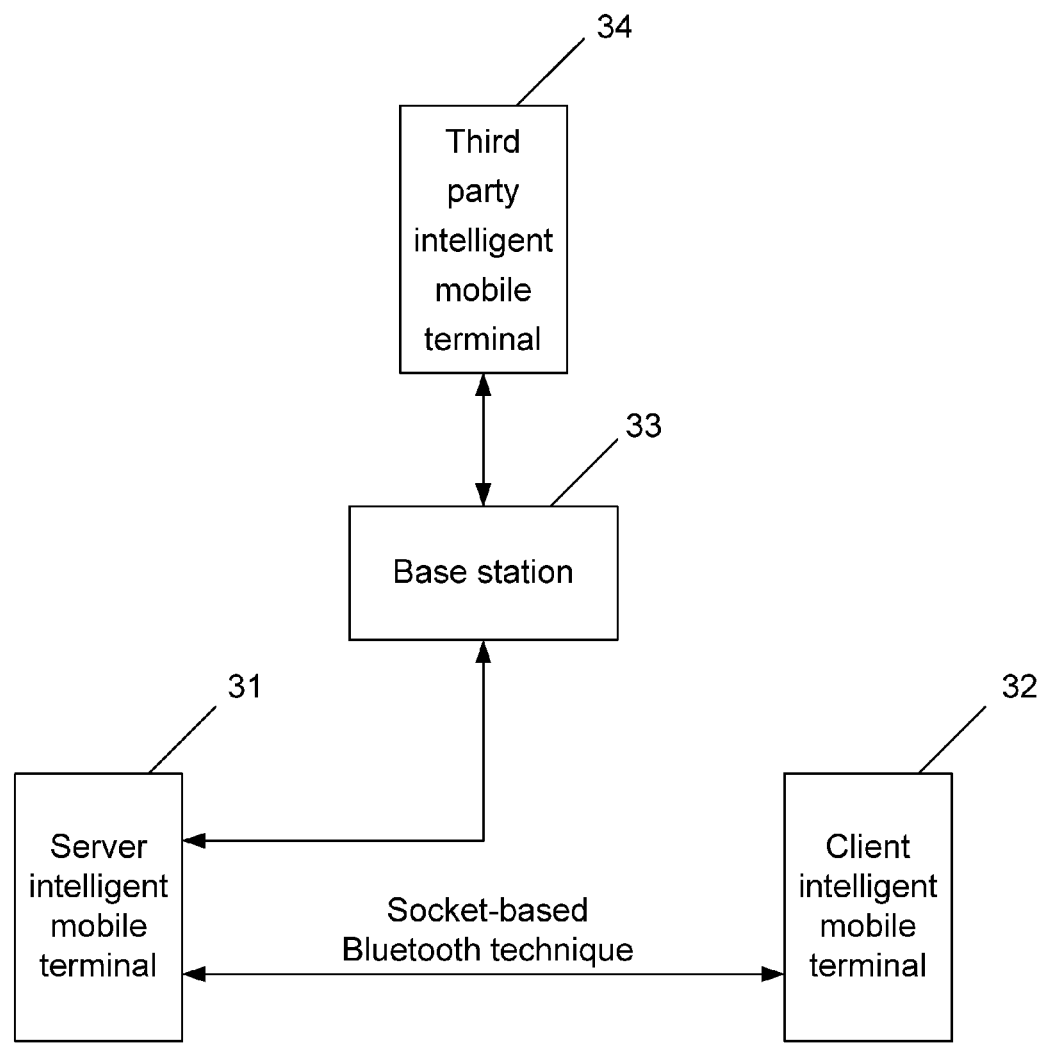
FIG. 3 shows a structure diagram of a system for implementing a three-party video call by mobile terminals of the disclosure.

To implement the above method, the system for implementing a three-party video call by mobile terminals of the disclosure as shown in FIG. 3 comprises: a server intelligent mobile terminal 31, a client intelligent mobile terminal 32, a base station 33 and a third party intelligent mobile terminal 34;

the server intelligent mobile terminal 31 is configured to process audio/video data from the client intelligent mobile terminal 32, and to send the processed audio/video data along with its own audio/video data to the third party intelligent mobile terminal 34; and further configured to distribute the received audio/video data from the third party intelligent mobile terminal 34 along with its own audio/video data to the client intelligent mobile terminal 32;

the client intelligent mobile terminal 32 is configured to receive the audio/video data from the server intelligent mobile terminal 31, and to send the audio/video data to the server intelligent mobile terminal 31;

herein, the client intelligent mobile terminal 32 is connected with the server intelligent mobile terminal 31 via a Socket-based Bluetooth technique.

The client intelligent mobile terminal 32 can comprise one or more intelligent mobile terminals.

The base station 33 is configured to transfer the audio/video data between the server intelligent mobile terminal 31 and the third party intelligent mobile terminal 34;

the third party intelligent mobile terminal 34 is configured to receive the audio/video data from the server intelligent mobile terminal 31, and to send the audio/video data to the server intelligent mobile terminal 31.

The above is only preferred embodiments of the disclosure and not intended to limit the scope of protection of the disclosure, and any modifications, equivalent replacements, improvements and the like within the spirit and principle of the disclosure shall fall within the scope of protection of the disclosure.

What is claimed is:

1. A method for implementing a three-party video call by mobile terminals, comprising:
   starting a Bluetooth feature of an intelligent mobile terminal acting as a server and that of an intelligent mobile terminal acting as a client, respectively;
   after a server intelligent mobile terminal and a client intelligent mobile terminal are bound together in terms of Bluetooth, starting, by the server intelligent mobile terminal and the client intelligent mobile terminal, their respective real-time transmission threads and real-time reception threads, and performing, by the server intelligent mobile terminal, audio/video data processing, so as to implement the three-party video call with a third party intelligent mobile terminal.

2. The method according to claim 1, wherein the server intelligent mobile terminal and the third party intelligent mobile terminal perform data transmission via a third generation (3G) network; and the client intelligent mobile terminal is not connected to the 3G network.

3. The method according to claim 2, further comprising: distributing, by the server intelligent mobile terminal, current information data in the server intelligent mobile terminal to the client intelligent mobile terminal;
   receiving, by the real-time reception thread in the server intelligent mobile terminal, audio/video data from the bound client intelligent mobile terminal;
   performing, by the real-time transmission thread and the real-time reception thread in the client intelligent mobile terminal, data exchange with the server intelligent mobile terminal respectively.

4. The method according to claim 3, wherein the performing, by the server intelligent mobile terminal, audio/video data processing, so as to implement the three-party video call with the third party intelligent mobile terminal comprises:
   processing and then communicating to the third party intelligent mobile terminal, by the server intelligent mobile terminal, the received audio/video data from the client intelligent mobile terminal, and processing and then communicating to the client intelligent mobile terminal, by the server intelligent mobile terminal, the received audio/video data from the third party intelligent mobile terminal;
   receiving, by the third party intelligent mobile terminal via the 3G network, the audio/video data processed by the server intelligent mobile terminal;
   receiving, by the client intelligent mobile terminal using a Socket-based Bluetooth technique, the audio/video data sent by the server, until the call ends.

5. The method according to claim 4, wherein the processing, by the server intelligent mobile terminal, the received audio/video data from the client intelligent mobile terminal comprises:
   performing bitmap conversion, clipping and merging on received image data; and performing sound mixing, automatic gain control and echo suppression processing on the received audio data under a 3G network protocol.

6. The method according to claim 5, wherein the receiving, by the client intelligent mobile terminal using the Socket-based Bluetooth technique, the audio/video data sent by the server comprises: performing, under a Bluetooth protocol, data processing on the received audio/video data, according to specific application demands.

7. The method according to claim 5, wherein the ending of the call comprises: automatically breaking, by the server intelligent mobile terminal, the Socket connection with the client intelligent mobile terminal, after receiving hang-up information from the third party intelligent mobile terminal; or automatically breaking the Socket connection between the server intelligent mobile terminal and the client intelligent mobile terminal, upon a disconnection request issued from either the server intelligent mobile terminal or the client intelligent mobile terminal.

8. The method according to claim 4, wherein the receiving, by the client intelligent mobile terminal using the Socket-based Bluetooth technique, the audio/video data sent by the server comprises: performing, under a Bluetooth protocol, data processing on the received audio/video data, according to specific application demands.

9. The method according to claim 4, wherein the ending of the call comprises: automatically breaking, by the server intelligent mobile terminal, the Socket connection with the client intelligent mobile terminal, after receiving hang-up information from the third party intelligent mobile terminal; or automatically breaking the Socket connection between the server intelligent mobile terminal and the client intelligent mobile terminal, upon a disconnection request issued from either the server intelligent mobile terminal or the client intelligent mobile terminal.

10. A system for implementing a three-party video call by mobile terminals, comprising: a server intelligent mobile terminal, a client intelligent mobile terminal, a base station and a third party intelligent mobile terminal; wherein, the server intelligent mobile terminal is configured to process audio/video data from the client intelligent mobile terminal; to send the processed audio/video data along with its own audio/video data to the third party intelligent mobile terminal; and to distribute received audio/video data from the third party intelligent mobile terminal along with its own audio/video data to the client intelligent mobile terminal;

the client intelligent mobile terminal is configured to receive the audio/video data from the server intelligent mobile terminal, and to send the audio/video data to the server intelligent mobile terminal; wherein the client intelligent mobile terminal is connected to the server intelligent mobile terminal by using a Socket-based Bluetooth technique;

the base station is configured to transfer the audio/video data between the server intelligent mobile terminal and the third party intelligent mobile terminal; and the third party intelligent mobile terminal is configured to receive the audio/video data from the server intelligent mobile terminal, and to send the audio/video data to the server intelligent mobile terminal.

11. The system according to claim 10, wherein the client intelligent mobile terminal comprises one or more intelligent mobile terminals.

* * * * *